(12) United States Patent
Porat

(10) Patent No.: US 12,130,503 B2
(45) Date of Patent: Oct. 29, 2024

(54) CONTACT LENS WITH ADAPTABLE CURVATURE

(71) Applicant: Hanita Lenses Ltd., Hanita (IL)

(72) Inventor: Menachem Porat, Hanita (IL)

(73) Assignee: HANITA LENSES LTD. (IL)

( * ) Notice: Subject to any disclaimer, the term of this patent is extended or adjusted under 35 U.S.C. 154(b) by 798 days.

(21) Appl. No.: 17/311,340

(22) PCT Filed: Dec. 5, 2018

(86) PCT No.: PCT/IL2018/051334
§ 371 (c)(1),
(2) Date: Jun. 6, 2021

(87) PCT Pub. No.: WO2020/115729
PCT Pub. Date: Jun. 11, 2020

(65) Prior Publication Data
US 2022/0026740 A1   Jan. 27, 2022

(51) Int. Cl.
*G02C 7/04* (2006.01)
*G02C 7/06* (2006.01)

(52) U.S. Cl.
CPC .............. *G02C 7/041* (2013.01); *G02C 7/043* (2013.01); *G02C 7/06* (2013.01)

(58) Field of Classification Search
CPC .......... G02C 7/041; G02C 7/043; G02C 7/06; G02C 7/049; G02C 7/048
(Continued)

(56) References Cited

U.S. PATENT DOCUMENTS

| 5,483,304 A | 1/1996 | Porat |
| 5,671,038 A | 9/1997 | Porat |

(Continued)

FOREIGN PATENT DOCUMENTS

| CA | 2678025 A1 | 8/2008 |
| EP | 0624811 | 11/1994 |

(Continued)

OTHER PUBLICATIONS

Ezekiel, D. F., & Ezekiel, D. J. (Jun. 1, 2002). A Soft Bifocal Lens That Does Not Compromise Vision. Contact Lens Spectrum. Retrieved Mar. 20, 2022, from https://www.clspectrum.com/issues/2002/june-2002/a-soft-bifocal-lens-that-does-not-compromise-visio.

(Continued)

*Primary Examiner* — William R Alexander
(74) *Attorney, Agent, or Firm* — ISUS INTELLECTUAL PROPERTY PLLC; Anthony Jason Mirabito

(57) ABSTRACT

A soft contact lens that includes a dome-shaped flexible sheet of material. The dome-shaped flexible sheet of material includes: (a) a non-optic zone comprising the periphery of the dome-shaped flexible sheet of material, and including: an upper peripheral zone comprising an upper part of the periphery of the dome-shaped flexible sheet of material, and a lower peripheral zone comprising a lower part of the periphery of the dome-shaped flexible sheet of material. The curvature of the dome-shaped flexible sheet of material is dynamically adaptable, by virtue of at least one of the upper and lower peripheral zones being structured to laterally expand and contract; and (b) an optic zone disposed in an area of the dome-shaped flexible sheet of material that lies between the upper and lower peripheral zones, wherein the optic zone is configured to align with a visual axis of the eye.

19 Claims, 6 Drawing Sheets

(58) Field of Classification Search
USPC .................................................. 351/159.19
See application file for complete search history.

(56) References Cited

U.S. PATENT DOCUMENTS

| | | | |
|---|---|---|---|
| 5,764,339 | A | 6/1998 | Horton |
| 6,491,392 | B2 | 12/2002 | Roffman et al. |
| 7,699,465 | B2 | 4/2010 | Dootjes et al. |
| 7,909,459 | B2 | 3/2011 | Ezekiel |
| 2010/0245760 | A1 | 9/2010 | Win-Hall |
| 2014/0063446 | A1 | 3/2014 | Wildsmith et al. |
| 2016/0370604 | A1* | 12/2016 | Thompson ............ A61F 9/0017 |
| 2017/0227788 | A1 | 8/2017 | Griffin et al. |
| 2019/0258083 | A1 | 8/2019 | Alster et al. |

FOREIGN PATENT DOCUMENTS

| | | |
|---|---|---|
| EP | 1242845 B1 | 9/2011 |
| JP | 2003517640 | 5/2003 |
| JP | 2004523778 | 8/2004 |
| JP | 2004526982 | 9/2004 |
| JP | 2008508567 | 3/2008 |
| JP | 2011515157 | 5/2011 |
| JP | 2014508974 | 4/2014 |
| JP | 2017523482 | 8/2017 |
| JP | 2020518857 | 6/2020 |
| WO | 1998014820 A1 | 4/1998 |
| WO | 2013033752 A1 | 3/2013 |

OTHER PUBLICATIONS

Edward S Bennett (2008) Contact lens correction of presbyopia, Clinical and Experimental Optometry, 91:3, 265-278, DOI: 10.1111/j.1444-0938.2007.00242.x.

Tranoudis, Ioannis & Efron, Nathan. (2005). Tensile properties of soft contact lens materials. Contact lens & anterior eye : the journal of the British Contact Lens Association. 27. 177-91. 10.1016/j.clae.2004.08.002.

PCT International Search Report for International Application No. PCT/IL2018/051334, mailed Mar. 24, 2019, 4pp.

PCT Written Opinion for International Application No. PCT/IL2018/051334, mailed Mar. 24, 2019, 5pp.

Office Action—corresponding Japanese Application No. 2021-531961, dated Jan. 10, 2023, 11 pages.

* cited by examiner

CONTACT LENS WITH ADAPTABLE CURVATURE

CROSS-REFERENCE TO RELATED APPLICATIONS

This application is a National Phase of PCT Application No. PCT/IL2018/051334 having International filing date of Dec. 5, 2018, which is incorporated herein by reference in its entirety.

FIELD OF THE INVENTION

The invention relates to the field of contact lenses.

BACKGROUND

Multifocal lenses typically have two or more areas, or zones, with different optical powers, such as a far-power optic zone for distance vision, and a near-power optic zone for near or close up vision. In multifocal lenses, the zones may be further subdivided into additional power zones.

Effective use of a bifocal contact lens requires translation of an ocular system between vision surfaces when an eye changes from gazing at an object at a distance to gazing at a nearby object. Alternatively, there may be a desire to have a translating multifocal contact lens that may have one or more intermediate-power zones in addition to far and near-power optic zones. Such a translating contact lens may have to have an ability to control and optimize the amount of movement of a lens when the pupil translates from distance vision, to intermediate vision, to near vision, or any combination thereof.

While there are many designs for soft translating contact lenses, soft contact lenses typically have difficulty translating across the surface of the eye when the focus changes from a straight-ahead gaze, to a downward gaze. Some soft bifocal contact lens designs provide an integrally formed bevel to aid translation. While other lens designs may allow the lens to translate across the surface of an eye when the focus changes from a straight-ahead gaze to a downward gaze, they are less efficient at allowing to control lens movement of a lens during an eye's translation to a different visual direction. Another prior art example, describes a soft multifocal contact lens that has an integrally formed ramped ridge zone adjoining an outwardly extending latitudinal ridge that sits on an eyelid to aid in translation of a lens. The latitudinal ridge portion has a bump at each end, thereby increasing elevation height of the ends of the ridge compared to the elevation height in the middle. However, a disadvantage of these and other known designs is discomfort to the wearer.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to soft contact lens which comprises: a dome-shaped flexible sheet of material, comprising: (a) a non-optic zone comprising the periphery of the dome-shaped flexible sheet of material, wherein the non-optic zone is configured to cover a portion of the cornea and portion of the sclera of an eye, wherein the non-optic zone comprises: an upper peripheral zone comprising an upper part of the periphery of the dome-shaped flexible sheet of material, and a lower peripheral zone comprising a lower part of the periphery of the dome-shaped flexible sheet of material, wherein the curvature of the dome-shaped flexible sheet of material is dynamically adaptable, by virtue of at least one of the upper and lower peripheral zones being structured to laterally expand and contract; and (b) an optic zone disposed in an area of the dome-shaped flexible sheet of material that lies between the upper and lower peripheral zones, wherein the optic zone is configured to align with a visual axis of the eye.

In some embodiments, the lateral expansion of at least one of the upper and lower peripheral zones causes an at least 9% increase in a circumference of the dome-shaped flexible sheet of material at a 45° arc that is centered at the upper or lower peripheral zone, respectively; and the lateral contraction of at least one of the upper and lower peripheral zones causes an at least 9% decrease in a circumference of the dome-shaped flexible sheet of material at a 45° arc that is centered at the upper or lower peripheral zone, respectively.

In some embodiments, the soft contact lens further comprises at least two slits, wherein: each slit is an elongated portion cut out of the lens; each slit maintains a gap extending from the periphery of the membrane until the base of the slit towards an inner region of the membrane when the slit is in a normally neutral state; and each slit is configured to open and close, thereby allowing the flexibility of the lens periphery in order to modify the curvature of the disk-shaped membrane.

In some embodiments, the gap of any one of the at least two slits is uniform along the length of the slit when the slit is in the normally neutral state.

In some embodiments, the gap of any of the at least two slits is non-uniform along the length of the slit when the slit is in the normally neutral state.

In some embodiments, any of the at least two slits has an elongated "U" shape when the slit is in the normally neutral state.

In some embodiments, any of the at least two slits has a "V" shape when the slit is in the normally neutral state.

In some embodiments, any of the at least two slits has a rectangular shape when the slit is in the normally neutral state.

In some embodiments, any of the at least two slits has a pointed picket shape when the slit is in the normally neutral state.

In some embodiments, the upper peripheral zone comprises at least one upper slit comprising at least one of the at least two elongated slits, wherein the at least one upper slit is configured to open and close, thereby dynamically adapting the curvature of the upper peripheral zone, and wherein the lower peripheral zone comprises at least one lower slit comprising at least another one of the at least two elongated slits, wherein the at least one lower slit is configured to open and close, thereby dynamically adapting the curvature of the lower peripheral zone.

In some embodiments, the at least one upper slit comprises at least two upper slits, and wherein the at least one lower slit comprises at least two lower slits.

In some embodiments, the optic zone comprises at least two optic zones having different dioptric powers.

In some embodiments, the optic zone comprises a distance vision zone, and a near vision zone, wherein the distance vision zone has a different dioptric power than the near vision zone.

In some embodiments, the optic zone has an aspheric configuration.

In some embodiments, the optic zone has a translating configuration.

In some embodiments, the optic zone has a concentric configuration, wherein the distance vision zone is located at the center of the optic zone, and wherein the near vision zone is ring-shaped and is located at the periphery of the optic zone.

In some embodiments, the optic zone further comprises a ring-shaped intermediate optic zone located between the distance vision zone and the near vision zone.

In some embodiments, the upper peripheral zone is configured to expand and the lower peripheral zone is configured to contract when the visual axis of the eye is aligned with the lower periphery of the optic zone, and wherein the upper peripheral zone and the lower peripheral zone are configured to be at a normally neutral state when the visual axis of the eye is aligned with the center of the optic zone.

In some embodiments, the soft contact lens further comprises a stabilizing middle zone positioned between the upper and lower peripheral zones, wherein the thickness of the stabilizing middle zone is greater than the thickness of the upper and lower peripheral zones.

In some embodiments, the soft contact lens has the following measurements: a length of each of the slits: 0.5-4 millimeters (mm), or 2-4 mm; and a gap provided by each of the slits: 0.1-1 mm.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1B:
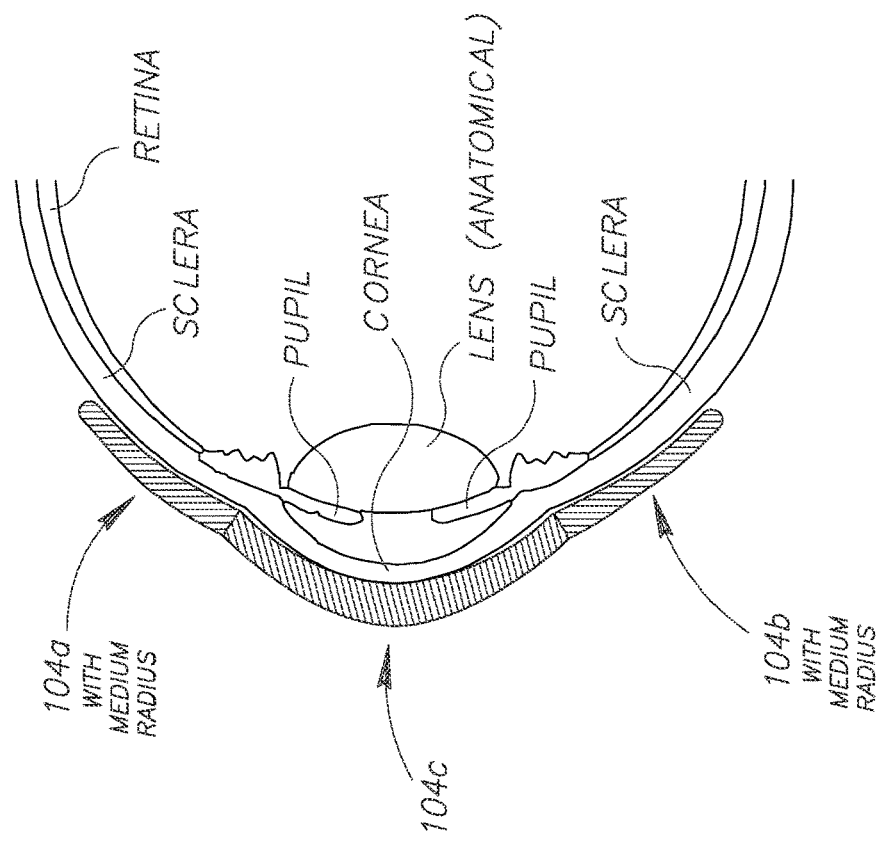
FIGS. 1A-1B show a frontal view and a cross-sectional view, respectively, of a soft contact lens having an adaptable curvature and worn on an eye which gazes straight, in accordance with an embodiment.

A soft translating multifocal contact lens is disclosed herein, having a dynamically adaptable periphery that expands and contracts, allowing the lens to modify its curvature to accommodate the changing shape of the wearer's eye as the lens moves vertically over the eye's surface. Optionally, the lens is a multifocal lens. As the wearer shifts his focus between the different vision zones of the lens, the lens moves vertically over the surface of the eyeball, accordingly. The ability of the lens to accommodate its curvature to the varying curvature of the eye's surface may provide an easier and more comfortable experience for the wearer when shifting his focus to different regions of the lens.

The lens's periphery may be disposed with one or more slits that open and close, thereby dynamically changing the curvature of the periphery and enabling the lens to move vertically over the surface of the eye as the wearer switches his focus between the various multifocal optical zones of the lens.

Reference is now made to FIGS. 1A, 1B, 2A, 2B, 3A, and 3B, which show a soft contact lens 100 having an adaptable curvature, in accordance with an embodiment. Each pair of these figures, namely 1A-B, 2A-B, and 3A-B, shows lens 100 in a frontal view and a cross-sectional view, respectively.

Lens 100 may be a dome-shaped flexible sheet of material (a suitable soft contact lens material), such as but not limited to silicon elastomers, silicone-containing macromers such as may include hydrogels, silicone-containing hydrogels, and the like. The surface of lens 100 may be a siloxane, or may include a substance having a siloxane functionality, such as polydimethyl siloxane macromers, methacryloxypropyl polydimethyl siloxane macromers, methacryloxypropyl polyalkyl siloxanes, and combinations thereof, and/or dilocone hydrogel or other hydrogel, such as etafilcon A. For a further discussion of soft contact lenses and their tensile properties, as well as suitable materials for soft contact lenses, see Ioannis Tranoudis et al., "Tensile properties of soft contact lens materials", in Contact Lens & Anterior Eye 27(4):177-91, January 2005.

The center region of lens 100 may be an optic zone 102 that aligns with the wearer's visual axis and provides one or more sub-regions for corrective vision, details of which are provided below. The peripheral region of lens 100 bordering optic zone 102 may be a non-optic zone, that covers a portion of the cornea and sclera of the eye. The non-optic zone may include three general sections: an upper peripheral zone 104a and lower peripheral zone 104b above and beneath the optic zone 102 at the upper and lower peripheries of lens 100, as well as a stabilizing middle zone 104c positioned between zones 104a and 104b, surrounding zone 102 from either side.

For the description that follows, it may be understood that the terms 'upper' and 'lower', and 'upwards' and 'downwards', are used for the purposes of clarity only, to accord the description with the drawings, and are not meant to be taken in an absolute sense. The lenses described herein below may have a symmetry about the horizontal axis, and thus the upper and lower features may be identical and interchangeable.

Figure 4:
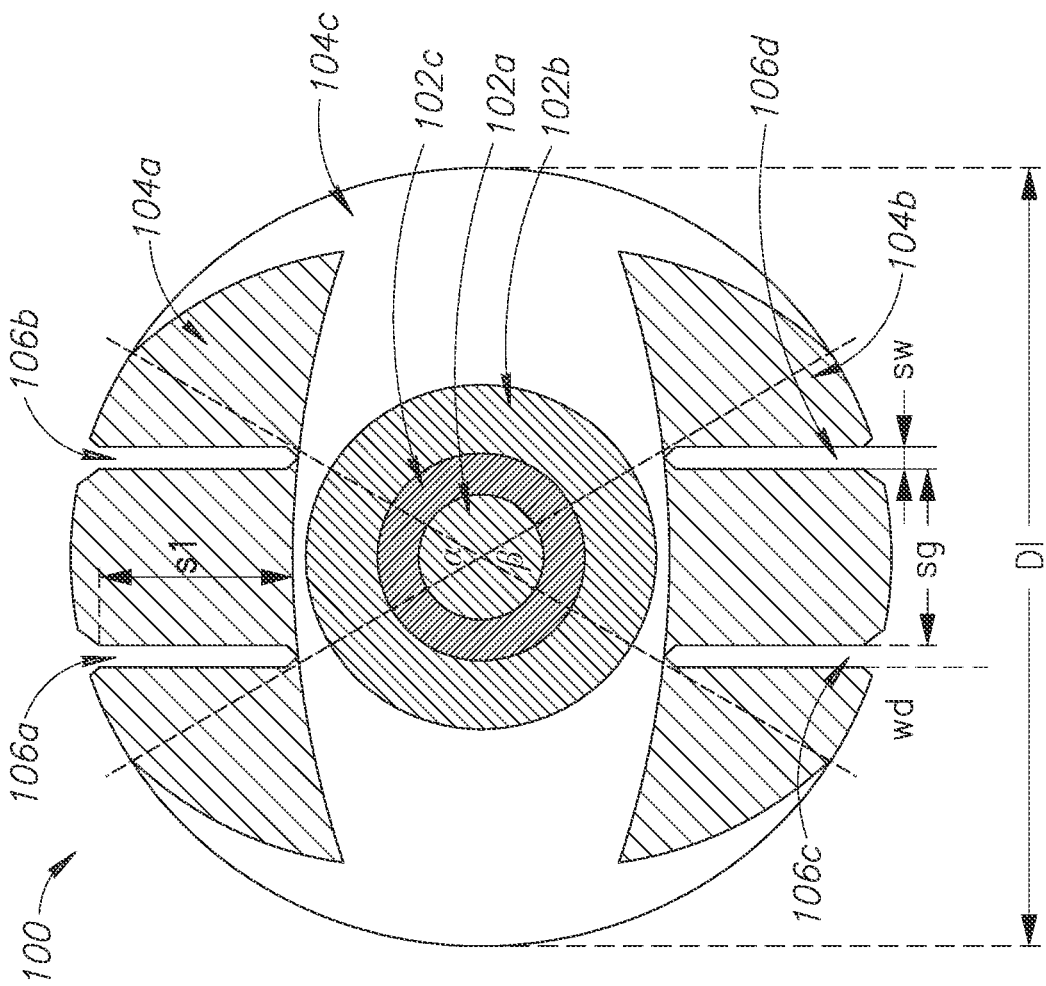
FIG. 4 shows a frontal view of the soft contact lens of FIGS. 1A-1B, with additional annotations and without a view of an iris, in accordance with an embodiment.

Non-optic zone 104 may include an upper peripheral zone 104a located at the upper periphery of lens 100, and a lower peripheral zone 104b located at the lower periphery of lens 100. The curvature of each of upper peripheral zone 104a and lower peripheral zone 104b may be dynamically adaptable, to allow modifying the overall curvature of lens 100 dynamically, and accommodate a vertical movement of lens 100 over the surface of the eye. This change of curvature may be expressed by a change in the circumference of lens 100 at one or two arcs extend over a certain angle at upper peripheral zone 104a and lower peripheral zone 104b. The arcs are illustrated in FIG. 4—they are the circumference of lens 100 (disregarding the circumference of the slits) delimited between the dashed lines forming angles α and β. The arcs may be, for example, of 45°. Namely, over upper and lower arcs of 45° each, the circumference may change between minus and plus 9% as lens 100 dynamically changes its curvature. These arcs are illustrated for the purpose of more clearly showing that the change of curvature of lens 100 is majorly expressed at these arcs, and less so (or not at all) beyond these arcs.

The at least 9% may be, in some embodiments, between 9-15%, 9-20%, 9-25%, 9-11%, 11-13%, 13-15%, 15-17%, 17-19%, 19-21%, 21-23%, 23-25%, or more than 25%. Each possibility represents a separate embodiment of the invention.

To achieve the curvature modification, one or more slits 106 may be provided with each of upper peripheral zone 104a and lower peripheral zone 104b, such as slits 106a, 106b, 106c, and 106d. Slits 106 may open at the periphery of lens 100 and close as necessary to dynamically adapt the curvature of lens 100, such as at peripheral zones 104a and 104b, accordingly. Optionally, lens 100 has two upper slits 106a, 106b, and two lower slits 106c, 106d, however it may be understood that this is but one implementation, and more or fewer slits may be used. For example, an alternative lens (not shown) may have three, or four, or five, or more upper slits, and three, or four, or five, or more, lower slits. Optionally, the number upper slits is different than the number of lower slits. For example, there may be more upper slits than lower slits, alternatively, there may be fewer upper slits than lower slits.

Slits 106 may be elongated and thin portions cut out of lens 100 that, in their normally neutral state (when the lens is in its rested state, namely when the wearer's gaze is straight ahead), maintain a gap extending from the periphery of lens 100 until the base of slits 106, towards an inner region of lens 100. When in the normally neutral state, slits 106 may have any suitable shape, such as but not limited to an elongated U-shape, V-shape, rectangular shape, a pointed picket-shape having a "V" shaped base pointing towards the center of lens 100 and elongated vertical walls extending to the periphery of lens 100. In the normally neutral state, the gap maintained along the length any of slits 106 may be substantially uniform. Alternatively, in the normally neutral state, the gap along any of slits 106 may be non-uniform, for example the gap may be larger at the periphery of lens 100 and may taper towards the base of slits 106. It may be appreciated that although slits 106 are shown having a uniform shape and size, this is not meant to be limiting, and different slits 106 on the same lens 100 may have a different shape and/or size. When opened, slits 106 increase the gap at the periphery of lens 100, when closed, slits 106 may decrease the gap at the periphery of lens 100. Slits 106 may fully close, closing the gap at the periphery of lens 100. Slits 106 may partially open and/or partially close, increasing and/or decreasing the circumference of lens 100 as necessary.

Figure 2B:
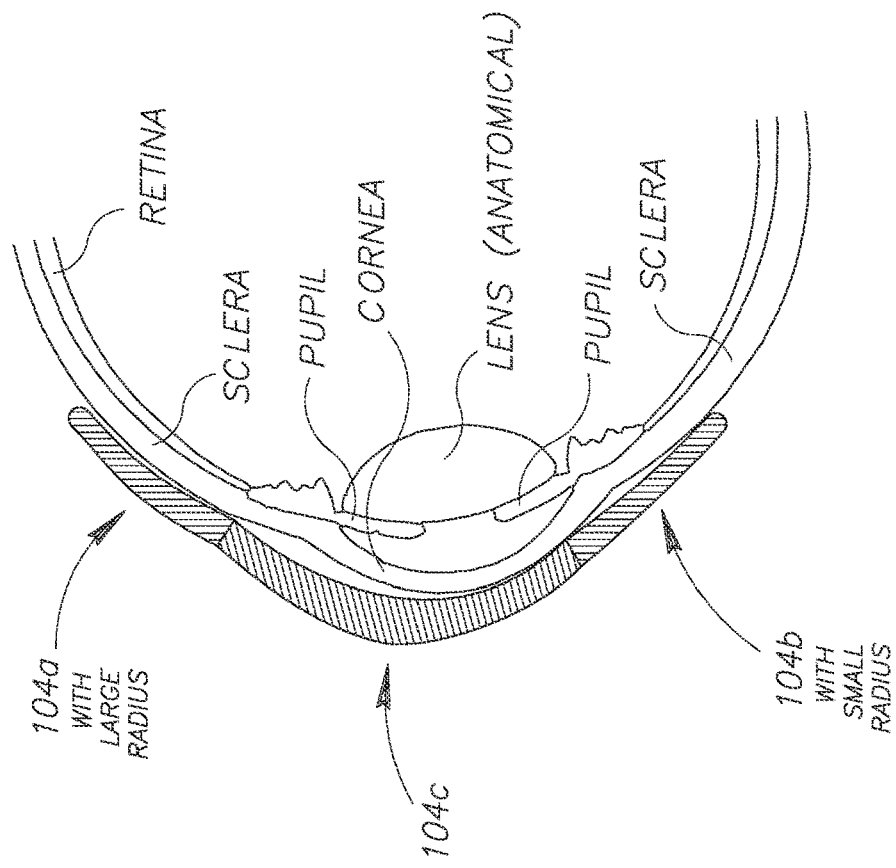
FIGS. 2A-2B show a frontal view and a cross-sectional view, respectively, of the soft contact lens of FIGS. 1A-B worn on an eye which gazes downwards, in accordance with an embodiment.
Figure 2A:
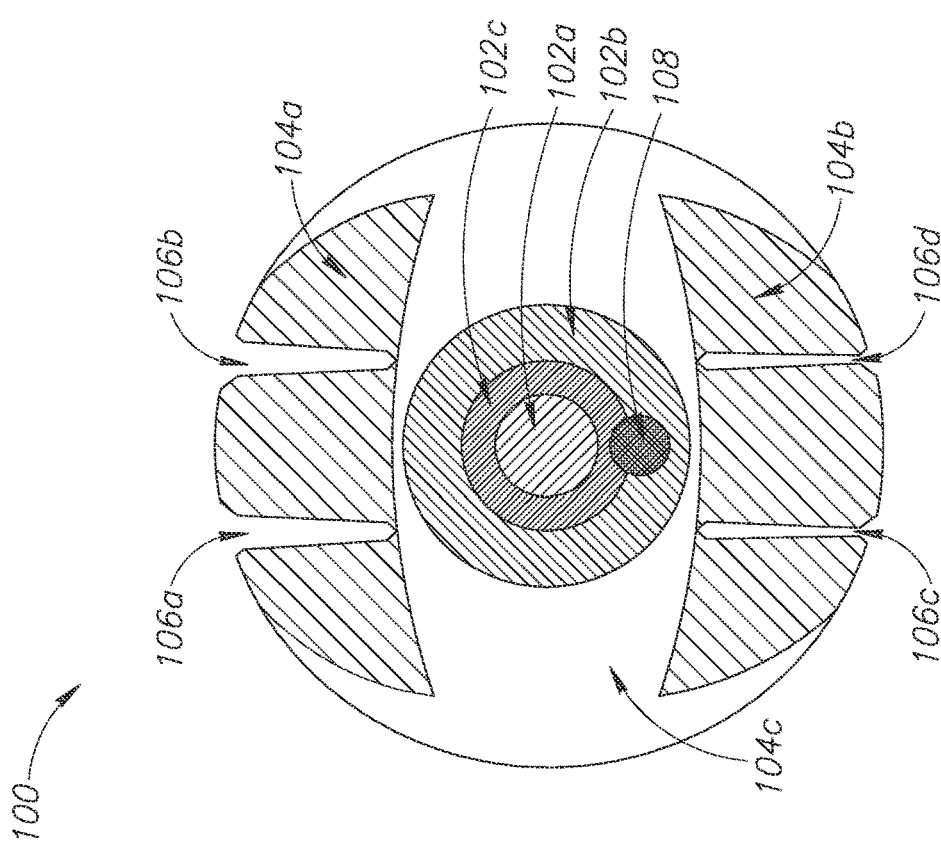
Figure 3B:
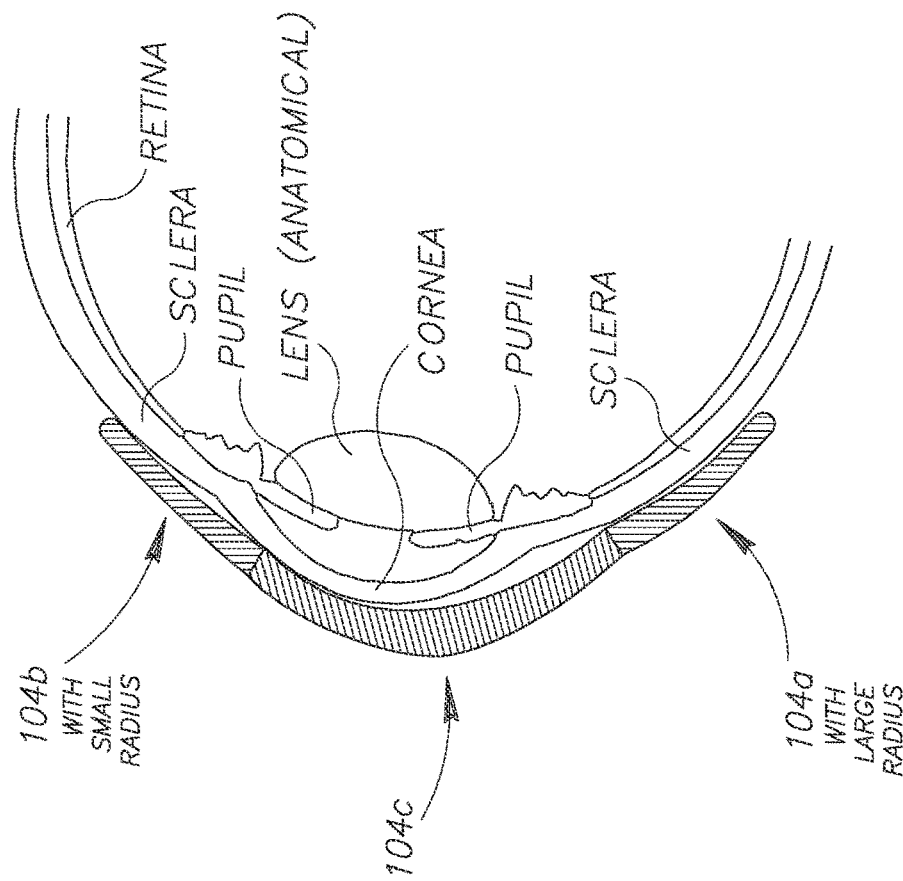
FIGS. 3A-3B show a frontal view and a cross-sectional view, respectively, of the soft contact lens of FIGS. 1A-B worn on an eye which gazes upwards, in accordance with an embodiment.
Figure 3A:
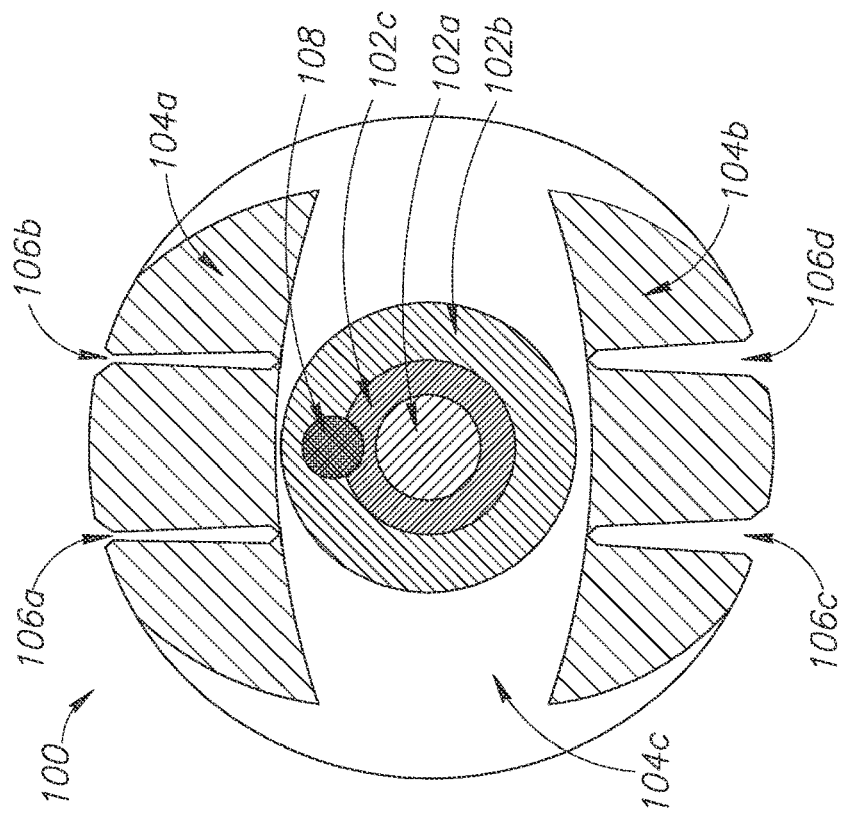

Opening slits 106 opens a wider gap at the periphery of lens 100, lengthening the circumference of lens 100. Referring to FIGS. 2A-B, upper slits 106a and 106b are open, lengthening the circumference of lens 100 at its upper periphery. When fully open, the gap caused by slits 106 at the periphery of lens 100 may range from 1 millimeter (mm) to 3 mm. When closed, the peripheral ends of slits 106 may touch (or be very close to one another, for example between 0.01 to 0.1 mm from each other), forming a teardrop shape, such as lower slits 106c and 106d of FIG. 2A, maintaining the uniform gap at the inner end of slits 100 and closing the gap at the periphery of lens 100, shortening the circumference of lens 100 at its lower periphery. The opening of slits 106 at any of upper and lower peripheral zones 104a and 104b causes their curvature to decrease and thus flatten, accordingly. Conversely, closing any of slits 106 at any of upper and lower peripheral zones 104a and 104b causes their curvature to increase and become more convex, accordingly. FIGS. 3A-B show the opposite of FIGS. 2A-B, namely—upper slits 106a and 106b are closed, and lower slits 106c and 106d are open.

Since the sclera of the eye is slightly less convex than the cornea (or, in different terms, the radius of the sclera is larger than the radius of the cornea), dynamically modifying the curvature of the peripheral regions of lens 100 by opening and/or closing any of slits 106 may allow fitting its curvature to different vertical positions on the eye's surface, in which different areas of the lens are positioned over different areas of the sclera and the cornea. Without the dynamic modification of the curvature of lens 100, a lens is at risk of remaining stationary on the eyeball when the wearer moves the eyeball around. Namely, a lens without dynamic curvature modification will likely move with the eyeball movement—up, down, right, and left. In contrast, the dynamic modification of present embodiments aids in ensuring that lens 100 can slide over the eyeball—but only up and down (vertically) and not laterally (horizontally)—when the wearer's gaze changes.

Optic zone 102 may include multiple sub-zones, each having a different dioptric power and correcting for a different type of refractive condition, such as a distance vision zone 102a for correcting for myopia, a near vision zone 102b for correcting for hyperopia, and 102c for correcting for intermediate vision. Alternatively, these optic sub-zones or other optic sub-zones which are not shown, may have a different purpose. Although the configuration illustrated in the figures for the different corrective sub-zones of optic zone 102 is concentric, this is but one implementation and is not meant to be limiting. Other suitable configurations such as aspheric or translating configurations may be used, accordingly.

In general, with respect to any configuration for optic zone 102, the upper peripheral zone 104a is configured to expand and the lower peripheral zone 104b is configured to contract when the visual axis of the eye is aligned with the lower periphery of the optic zone, allowing lens 100 to move vertically upwards with respect to the eyeball. Similarly, upper peripheral zone and the lower peripheral zone 104a and 104b are configured to be at their normally neutral state when the visual axis of the eye is aligned with the center of the optic zone.

Figure 1A:
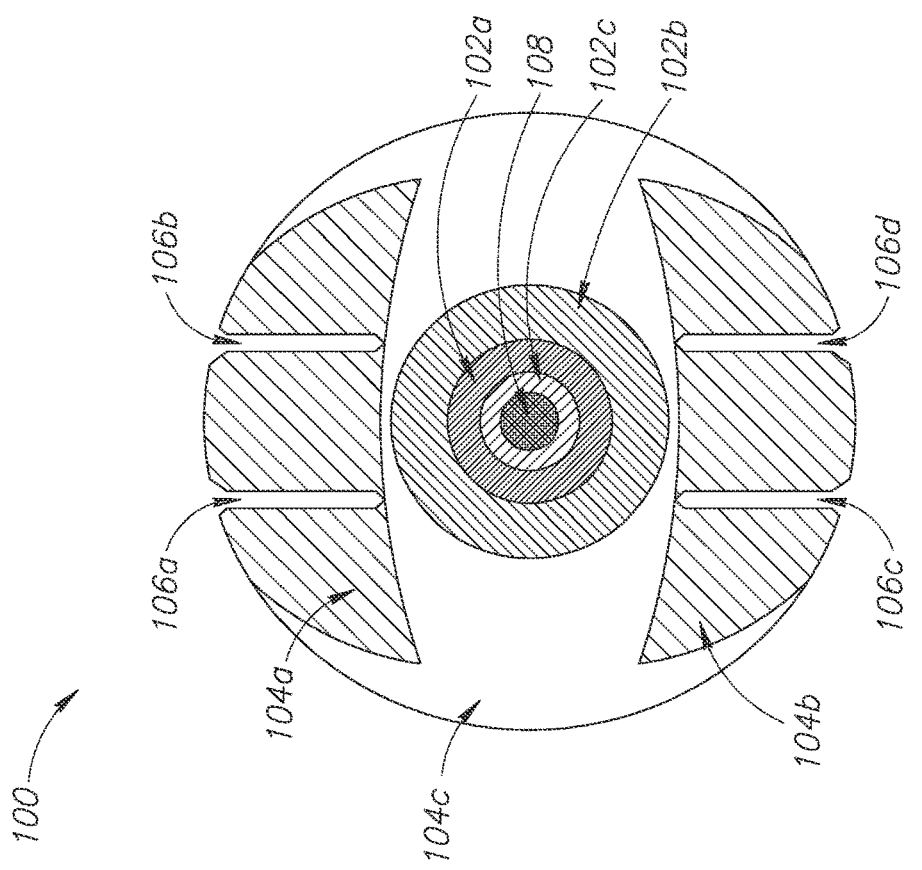

Distance vision zone 102a, may be substantially round-shaped and located at the center of the optic zone 102, comprising the center of lens 100, allowing the wearer to focus for distance by looking straight ahead when lens 100 is positioned centrally over the cornea. As shown in FIGS. 1A-B, the wearer's pupil 108 is positioned in the middle of distance vision zone 102a aligning his visual axis through the center of lens 100, to correct his distance vision.

Near vision zone 102b may be substantially ring-shaped and may be located at the periphery of the optic zone 102, allowing the wearer to focus for near vision by looking down, such as when reading. As shown in FIG. 2A, the near vision zone 102b comprising the bottom periphery of the optic zone 102 is positioned substantially over the wearer's pupil 108, aligning his visual axis through the bottom of optic zone 102, to correct his near vision. The difference between FIGS. 1A-B and FIGS. 2A-B may be appreciated as the position of lens 100, centered over the cornea for distance vision in FIGS. 1A-B, has shifted upwards relative to the pupil 108 in FIGS. 2A-B when the wearer aligns his visual axis (pupil 108) with the lower near vision zone 102b for near vision. Such vertical shifting of lens 100 over the wearer's eyeball may be facilitated by modifying the curvature of the upper and lower peripheral zones 104a and 104b via slits 106a, 106b, 106c, and 106d to accommodate the changing curvature of the eyeball. Conversely, when the wearer aligns his visual axis (pupil 108) with the upper near vision zone 102b for near vision, as shown in FIGS. 3A-3B, the position of lens 100 shifts downwards relative to pupil 108.

Optionally, lens 100 may include a ring-shaped intermediate optic zone 102c located between the distance vision zone 102a and the near vision zone 102b to correct for an intermediate focal distances ranging between far and near ranges. Shifting the visual axis to align with intermediate optic zone 102a corrects the wearer's intermediate vision accordingly.

Optionally, lens 100 may include a zone for correcting astigmatism, and which may overlap or be separate from the corrective zones described above.

Reference is now made to FIG. 4, which, for the purposes of clarity, shows lens 100 of FIG. 1A with additional annotations, useful for conveying various measurements of the lens. The length of each of slits 106 may range from 0.5 to 4 mm, or more specifically from 2 to 4 mm, for example approximately 2.7 mm. Slits 106 may extend inwards, from the outer edge of lens 100. Optionally, slits 106 may extend from the edge of lens 100 until the outer edge of optic zone 102. Slits 106 may have a neutral 'straight' position that maintains a uniform gap along the length of slit ranging from 0.1 to 1 mm (FIG. 1A), for example approximately 0.5 mm. The distance 'sg' between slits may range from 3.0 mm to 7.0 mm, for example approximately 5.0 mm.

Optionally, one or more portions of middle zone 104c of lens 100, positioned between the upper and lower peripheral zones 104a and 104b, may be thicker than upper and lower peripheral zones 104a and 104b, serving to stabilize lens 100 horizontally over the eye. The total diameter of near vision zone 102b may range between 8 mm and 9 mm and may be approximately 8.5 mm. The total diameter of distance vision zone 102a may range between 4 mm and 5 mm, for example approximately 4.5 mm. The thickness of intermediate zone 104c may range from 0.25 mm and 0.75 mm and may be approximately 0.5 mm. The diameter D1 of lens 100 may range from 12 mm and 16 mm, and may be approximately 14.2 mm. The thickness of lens 100 at middle zone 104c, in FIG. 3A, may range from 0.3 mm and 0.4 mm, and may be approximately 0.35 mm. The thickness of lens 100 at points at the thin areas, indicated in grey, may range from 0.2 mm and 0.3 mm, and may be approximately 0.25 mm.

Figure 5:
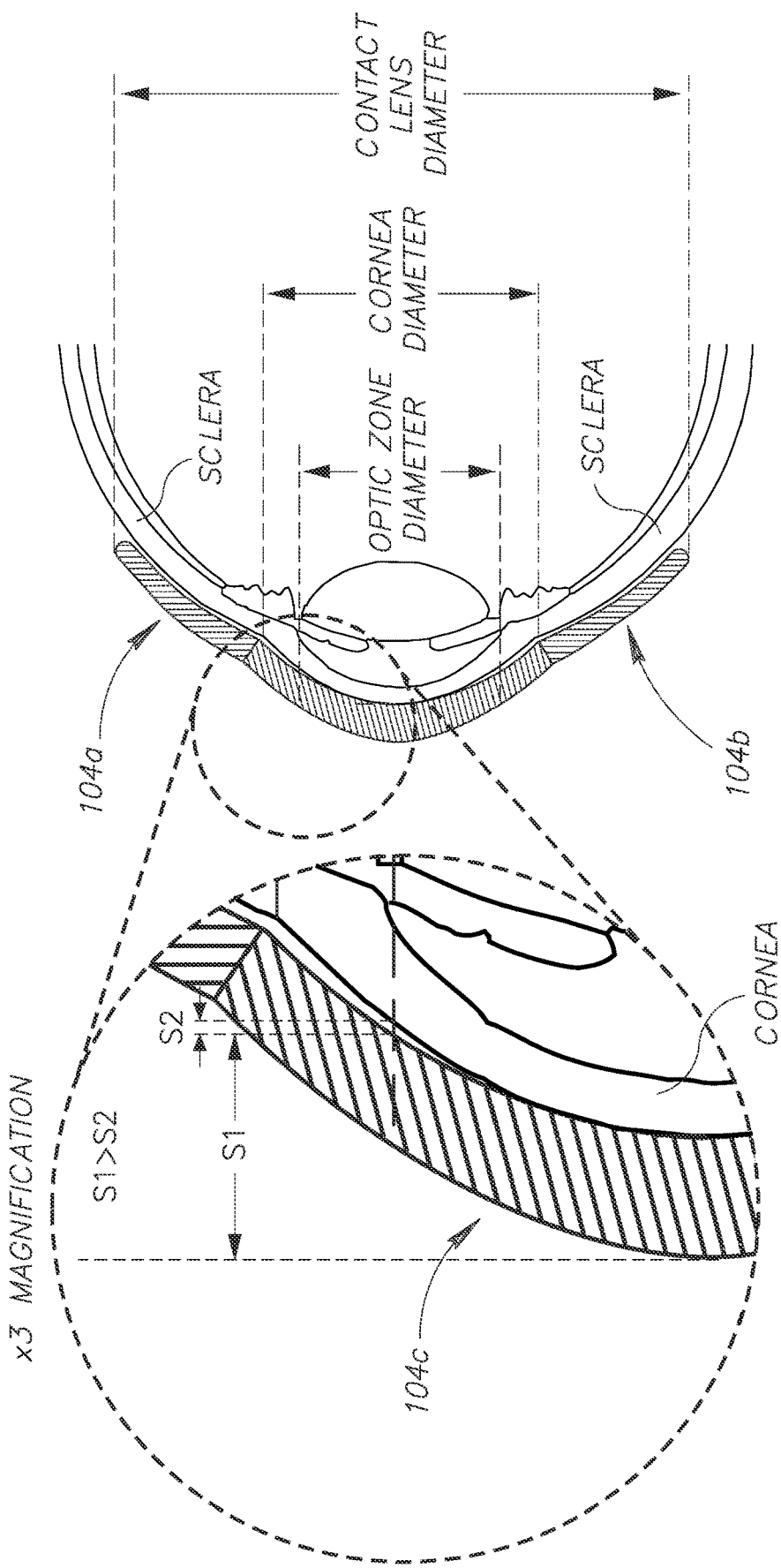
FIG. 5 shows a cross-sectional view of a soft contact lens, in accordance with an embodiment.

Some optical defects, such as astigmatism, are caused by a deformation of the cornea or inner source due to the inner shape of the eye's lens. Referring to FIG. 5, the curvature of the anterior face of the central optic zone 102a may accommodate such deformations by having a different radius at the horizontal and vertical meridian.

The central optic zone 102a portion of lens 100, which is configured to rest over a human cornea, may be somewhat flatter (i.e., having a larger radius) than a typical cornea. The sagittal depth, S2, of the posterior face of the central optic zone 102a, may be smaller than the sagittal depth S1 of the cornea, resulting in a gap of S1 minus S2 between lens 100 and the eye's surface at the cornea. This gap may reduce surface tension between lens 100 and the surface of the eye, allowing the lens 100 to move over the surface of the eye more freely.

Optionally, the gap may range from 0.001 mm to 0.1 mm. This gap, caused by the relative flatness of lens 100, together with slits 106 allow lens 100 to move over the eye's surface in response to the user's change of focus.

The vertical motion of lens 100 over the eye is now described:

Referring to FIGS. 1A-B, slits 106 are at a normally neutral state when the pupil 108 is positioned over the center of lens 100, aligning the visual axis of the eye (pupil 108) with the distance vision zone 102a at the center of lens 100.

Referring to FIGS. 2A-B, as the wearer turns his gaze downwards, such as to read, the eyeball rotates downwards, shifting the visual axis of his eye down to the lower near vision zone 102b. As the wearer blinks, his lower and upper eyelids may push lens 100 upwards. Upper slits 106a and 106b open, expanding upper peripheral zone 104a slightly, and flattening the curvature of lens 100 at upper peripheral zone 104a to accommodate the slightly less convex sclera above the cornea. At the same time, lower slits 106c and 106d close, contracting lower peripheral zone 104b slightly, and increasing the curvature of lens 100 at lower peripheral zone 104b to accommodate the slightly more convex cornea, now aligned with near vision zone 102b at the lower portion of optic zone 102, adjacent to the upper portion of lower peripheral zone 104b. Modifying the curvature of lens 100 thus, and reducing its surface tension with the surface of the eyeball may facilitate this upwards motion over the surface of the eyeball.

When the wearer shifts his gaze back for distance vision, slits 106 revert to their normally neutral state as shown in FIGS. 1A-B, and lens 100 returns to be centrally aligned over the cornea, with the pupil 108 positioned centered in distance vision zone 102a.

FIGS. 3A-B show the opposite of FIGS. 2A-B. Namely, in FIGS. 3A-B, the wearer turns his gaze upwards, the eyeball rotates upwards, shifting the visual axis of his eye up to the upper near vision zone 102b. Lower slits 106c and 106d open, expanding lower peripheral zone 104b slightly, and flattening the curvature of lens 100 at lower peripheral zone 104b to accommodate the slightly less convex sclera below the cornea. At the same time, upper slits 106a and 106b close, contracting upper peripheral zone 104a slightly, and increasing the curvature of lens 100 at upper peripheral zone 104b to accommodate the slightly more convex cornea, now aligned with near vision zone 102b at the lower portion of optic zone 102, adjacent to the lower portion of upper peripheral zone 104b.

The optical properties described above may be implemented on both sides of lens 100, allowing the wearer to place either face of the lens on the surface of the eye, to correct the vision accordingly. For example, correction for astigmatism, myopia and hyperopia may be implemented on any side of lens 100. Lens 100 may be a Toric lens and may be produced using any suitable technology, such as by standard lath cut, molded, oscillation system, or diffractive technology.

It may be appreciated that the lens described above allows the lens to move over the eyeball while avoiding some of the drawbacks of the ballasted lens designs. Ballasted lenses are typically thicker at their lower half to provide stability. However, this thickness at the lower half may cut off the supply of oxygen to the cornea and regions of the sclera, interfering with the proper metabolism of these tissues and leading to discomfort by the wearer.

Lens 100 may be manufactured using any suitable method, such as but not limited to spin-cast techniques, injection moulding, cast moulding, etc. For example, a suitable cast moulding technique is described PCT Publication No. WO2013/033752 to Ezekiel.

Figure 6:
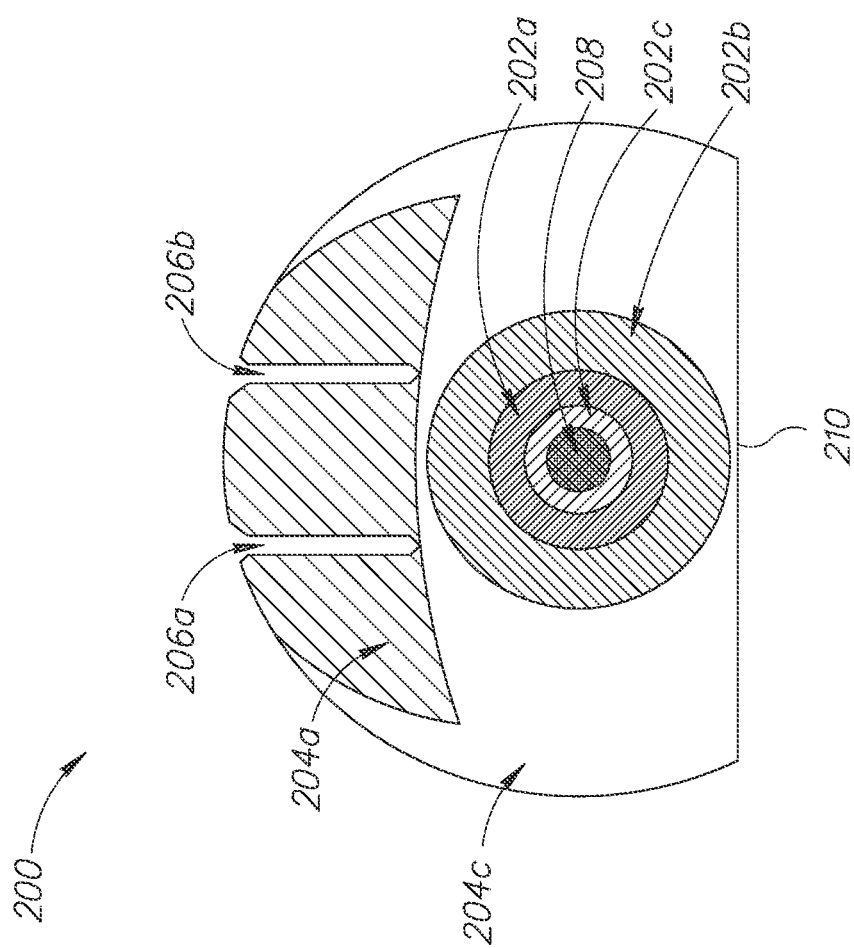
FIG. 6 shows a frontal view of a soft contact lens having an adaptable curvature and worn on an eye which gazes straight, in accordance with an embodiment.

Reference is now made to FIG. 6, which shows a soft contact lens 200 having an adaptable curvature, in accordance with an embodiment. Lens 200 is similar to lens 100 of the former figures, with the notable difference that lens 200 is truncated 210 at its lower area, and is devoid of a lower peripheral zone. Reference numerals in FIG. 6 are larger by 100 than their corresponding elements in the previous figures, to simplify the discussion. All these elements may be identical across FIG. 6 and the other figures.

This truncated structure of lens 200 avoids the need for lower peripheral slits, because there is now nothing in the lower area of the lens which prevents it from freely sliding over the varying curvature of the cornea and/or sclera.

The truncation line may be straight, as shown in FIG. 6, or may be arcuate or have any other shape (not shown). The truncation line may be perpendicular to a longitudinal dimension of slits 206a-b, or be disposed at an angle of, for example, 60 to 120 degrees relative to that longitudinal dimension (not shown).

The truncation line may border with optic zone 202, or be slightly distant from it, such as at a distance of 0.3-0.6 mm, 0.6-0.9 mm, 0.9-1.2 mm, 1.2-1.5 mm, 1.5-1.8 mm, or more than 1.8 mm from the optic zone. Each possibility represents a separate embodiment of the invention.

Those of skill in the art will also readily recognize an opposite embodiment (not shown), in which the truncation line is at the top of the lens and the one or more slits are at its bottom.

In the figures, elements are not always provided with reference numbers; a certain element, for example, may be provided with a reference number in one of more figures, and be shown without that reference number in other one or more figures—merely for reasons of brevity. Since all figures in this application show the same device, it is intended that an element having the same shape and appearing in different figures, sometimes with a reference number and sometimes not—be interpreted as the same element.

In the description and claims of the application, each of the words "comprise" "include" and "have", and forms thereof, are not necessarily limited to members in a list with which the words may be associated.

What is claimed is:

1. A soft contact lens, comprising:
a dome-shaped flexible sheet of material, comprising:
(a) a non-optic zone comprising the periphery of the dome-shaped flexible sheet of material, wherein the non-optic zone is configured to cover a portion of the cornea and portion of the sclera of an eye, wherein the non-optic zone comprises:
an upper peripheral zone comprising an upper part of the periphery of the dome-shaped flexible sheet of material, and
a lower peripheral zone comprising a lower part of the periphery of the dome-shaped flexible sheet of material; and further comprising
at least one slit comprising a an elongated portion cut out of the lens, wherein each said slit maintains a gap extending from the periphery of the contact lens until the base of the slit towards an inner region of the contact lens when the slit is in a normally neutral state; and
the curvature of the dome-shaped flexible sheet of material is dynamically adaptable, by virtue of each said slit being configured to open and close, enabling at least one of the upper and lower peripheral zones to laterally expand and contract, thereby allowing flexibility of the lens periphery in order to modify the curvature of the disk-shaped contact lens; and
(b) an optic zone disposed in an area of the dome-shaped flexible sheet of material that lies between the upper and lower peripheral zones, wherein the optic zone is configured to align with a visual axis of the eye.

2. The soft contact lens of claim 1, wherein:
the lateral expansion of at least one of the upper and lower peripheral zones causes an at least 9% increase in a circumference of the dome-shaped flexible sheet of material at a 45° arc that is centered at the upper or lower peripheral zone, respectively; and
the lateral contraction of at least one of the upper and lower peripheral zones causes an at least 9% decrease in a circumference of the dome-shaped flexible sheet of material at a 45° arc that is centered at the upper or lower peripheral zone, respectively.

3. The soft contact lens of claim 1, wherein the gap of any one of the at least one slit is uniform along the length of the slit when the slit is in the normally neutral state.

4. The soft contact lens of claim 1, wherein the gap of any of the at least one slit is non-uniform along the length of the slit when the slit is in the normally neutral state.

5. The soft contact lens of claim 1, wherein any of the at least one slit has an elongated "U" shape when the slit is in the normally neutral state.

6. The soft contact lens of claim 1, wherein any of the at least one slit has a "V" shape when the slit is in the normally neutral state.

7. The soft contact lens of claim 1, wherein any of the at least one slit has a rectangular shape when the slit is in the normally neutral state.

8. The soft contact lens of claim 1, wherein any of the at least one slit has a pointed picket shape when the slit is in the normally neutral state.

9. The soft contact lens of claim 1, wherein the at least one slit is at least two slits, wherein the upper peripheral zone comprises at least one upper slit comprising at least one of the at least two elongated slits, wherein the at least one upper slit is configured to open and close, thereby dynamically adapting the curvature of the upper peripheral zone, and wherein the lower peripheral zone comprises at least one lower slit comprising at least another one of the at least two elongated slits, wherein the at least one lower slit is configured to open and close, thereby dynamically adapting the curvature of the lower peripheral zone.

10. The soft contact lens of claim 9, wherein the at least one upper slit comprises at least two upper slits, and wherein the at least one lower slit comprises at least two lower slits.

11. The soft contact lens of claim 1, wherein: the upper peripheral zone comprises the at least one slit, wherein the at least one slit is configured to open and close, thereby dynamically adapting the curvature of the upper peripheral zone, and
the lower peripheral zone is truncated.

12. The soft contact lens of claim 1, wherein: the lower peripheral zone comprises the at least one slit, wherein the at least one slit is configured to open and close, thereby dynamically adapting the curvature of the lower peripheral zone, and the upper peripheral zone is truncated.

13. The soft contact lens of claim 1, wherein the optic zone comprises at least two optic zones having different dioptric powers.

14. The soft contact lens of claim 13, wherein the optic zone comprises a distance vision zone, and a near vision zone, wherein the distance vision zone has a different dioptric power than the near vision zone.

15. The soft contact lens of claim 13, wherein the optic zone has an aspheric configuration.

16. The soft contact lens of claim 13, wherein the optic zone has a translating configuration.

17. The soft contact lens of claim 13, wherein the optic zone has a concentric configuration, wherein the distance vision zone is located at the center of the optic zone, and wherein the near vision zone is ring-shaped and is located at the periphery of the optic zone, and wherein the optic zone further comprises a ring-shaped intermediate optic zone located between the distance vision zone and the near vision zone.

18. The soft contact lens of claim 1, wherein the upper peripheral zone is configured to expand and the lower peripheral zone is configured to contract when the visual axis of the eye is aligned with the lower periphery of the optic zone, and wherein the upper peripheral zone and the lower peripheral zone are configured to be at a normally neutral state when the visual axis of the eye is aligned with the center of the optic zone.

19. The soft contact lens of claim 1, further comprising a stabilizing middle zone positioned between the upper and lower peripheral zones, wherein the thickness of the stabilizing middle zone is greater than the thickness of the upper and lower peripheral zones.

* * * * *